L. C. STUKENBORG.
COTTON PICKER.
APPLICATION FILED APR. 21, 1917.

1,264,575.

Patented Apr. 30, 1918.
3 SHEETS—SHEET 1.

Witness:
Harry S. Gaither

Inventor:
Louis C. Stukenborg
by William L. Hale
Atty.

L. C. STUKENBORG.
COTTON PICKER.
APPLICATION FILED APR. 21, 1917.
1,264,575.
Patented Apr. 30, 1918.
3 SHEETS—SHEET 2.
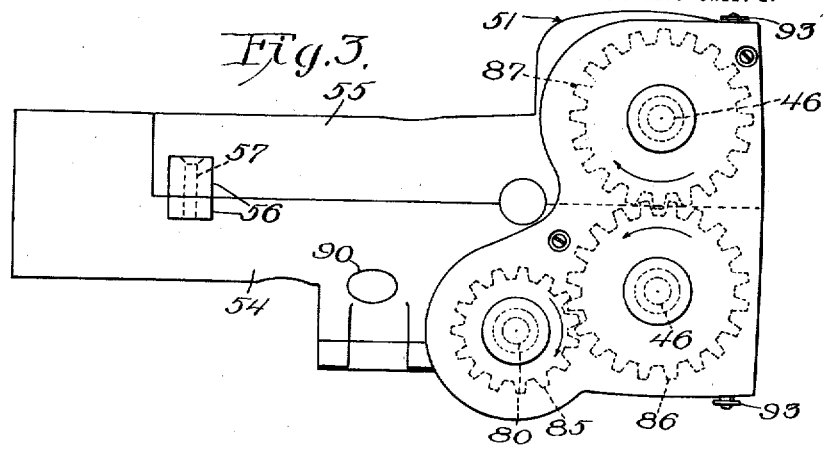
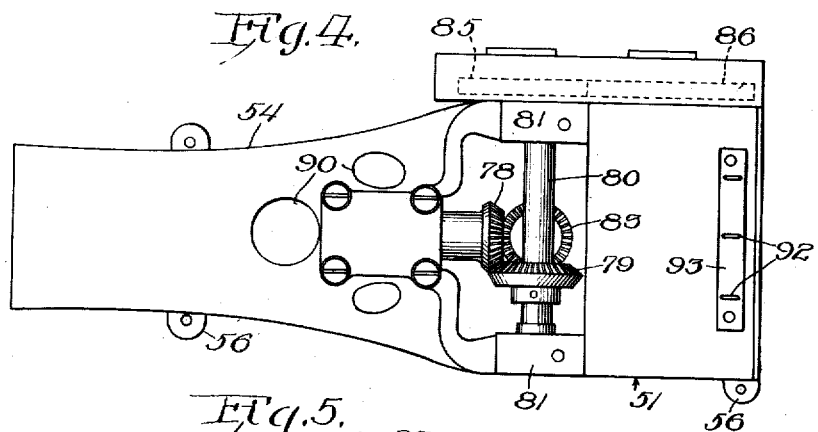
Witness:
Harry S. Gaither
Inventor:
Louis C. Stukenborg
by William L. Hasey
Atty.

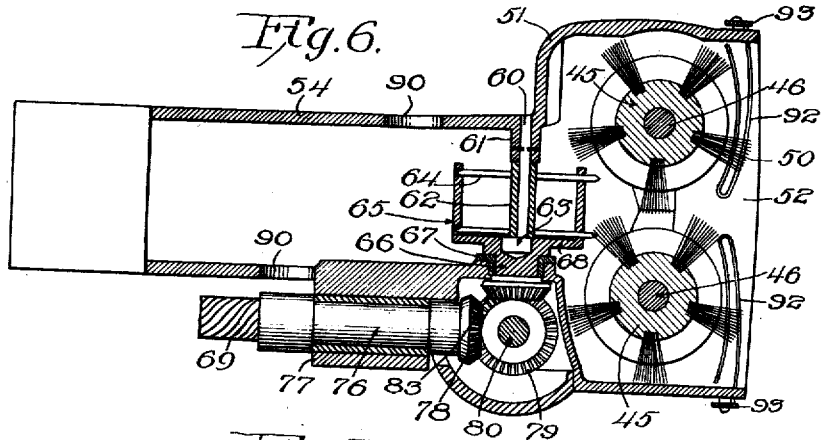
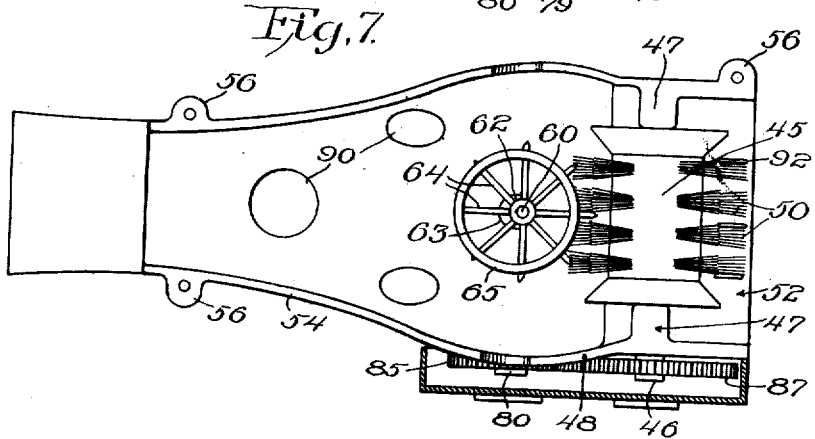

UNITED STATES PATENT OFFICE.

LOUIS CARROLL STUKENBORG, OF CHICAGO, ILLINOIS, ASSIGNOR OF ONE-HALF TO FREDERICK W. STUKENBORG, OF CHICAGO, ILLINOIS.

COTTON-PICKER.

1,264,575.  Specification of Letters Patent.  Patented Apr. 30, 1918.

Application filed April 21, 1917. Serial No. 163,540.

*To all whom it may concern:*

Be it known that I, LOUIS C. STUKENBORG, a citizen of the United States, and a resident of Chicago, in the county of Cook and State of Illinois, have invented certain new and useful Improvements in Cotton-Pickers; and I do hereby declare that the following is a full, clear, and exact description thereof, reference being had to the accompanying drawings, and to the character of reference marked thereon, which form a part of this specification.

This invention relates to improvements in cotton pickers and refers more particularly to that general type of cotton picker shown in my prior U. S. Letters Patent No. 1131804, dated March 16, 1915.

The present invention relates to novel means for picking or removing the cotton from the bolls, and the purpose of the invention is to produce a mechanism constructed and arranged to remove the cotton without breaking the fibers, and arranged to comb the fibers to open the locks and to segregate them and the seeds thereof and adhering fibers from each other so as to produce a fluffy picked product, and to brush or loosen the boll dirt and particles of leaves from the cotton for ready and efficient separation therefrom, and to means for carrying the cotton rearwardly in such a way as to prevent matting or pressing of the cotton after it leaves the bur and to preserve its open and fluffy condition so as to facilitate the separation of the dirt and leaf particles therefrom. By reason of these conditions the gin will perform better work and produce more lint cotton per bale of seed cotton, and a better and a cleaner linter staple.

A further object of the invention, achieved by the manner of picking and conveying the cotton, is to remove a large percentage of moisture from the seed cotton, thereby preparing the seed cotton for the gin to produce a better lint staple and drier seed.

A further purpose of the invention is to produce a construction of cotton picker mechanism which prevents the carrying of the bur backwardly with the cotton, and to provide a guard in front of the picking means which will reject or kick out the bur after the cotton has been pulled therefrom.

Other objects of the invention are to improve and simplify cotton pickers, and the invention consists in the combination and arrangement of the elements shown in the drawings and described in the specification, and is pointed out in the appended claims.

In the drawings;

Fig. 3 is an enlarged side elevation of the picker head.

Fig. 4 is a bottom plan view thereof.

Fig. 5 is a front elevation of the head.

Fig. 6 is a longitudinal vertical section of one form of the head.

Fig. 7 is a plan view thereof with a portion of the casing removed.

Figure 1:
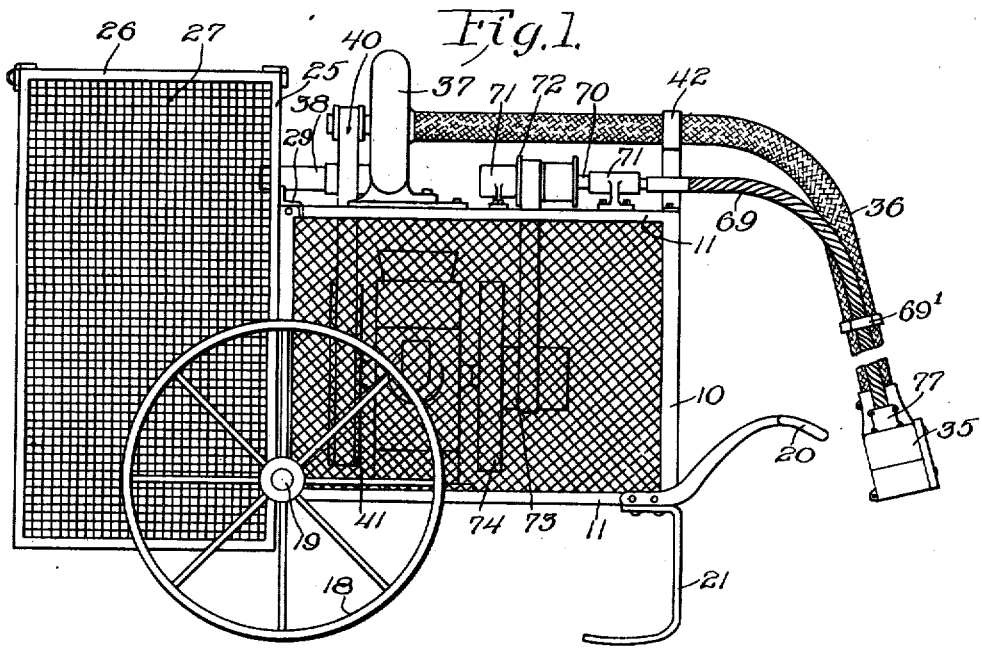
Figure 1 is a side elevation of a cotton picker machine embodying my invention.

As shown in the drawings, 10 designates, as a whole, the frame of the machine which is rectangular at its rear end and is tapered toward its forward end, the tapered upper and lower members 11 thereof being joined by short transverse portions 12. The rectangular portion 13 of the frame is made of a dimension to carry the operating motor, which in this instance consists of an explosive engine 14. Said frame as herein shown is made of skeleton flanged frame members between which is stretched wire netting, but may be otherwise constructed.

The frame is supported on two wheels 18 which are rotatively mounted on spindles of a fixed axle 19 suitably connected to the rear lower end member of the frame. The machine as herein shown may be drawn forwardly by one or more handles 20 that are attached to the forward narrow end of the machine frame and the weight of the forward portion of the machine frame, when the machine is stationary, is borne by one or more legs 21 of any suitable design.

Figure 2:
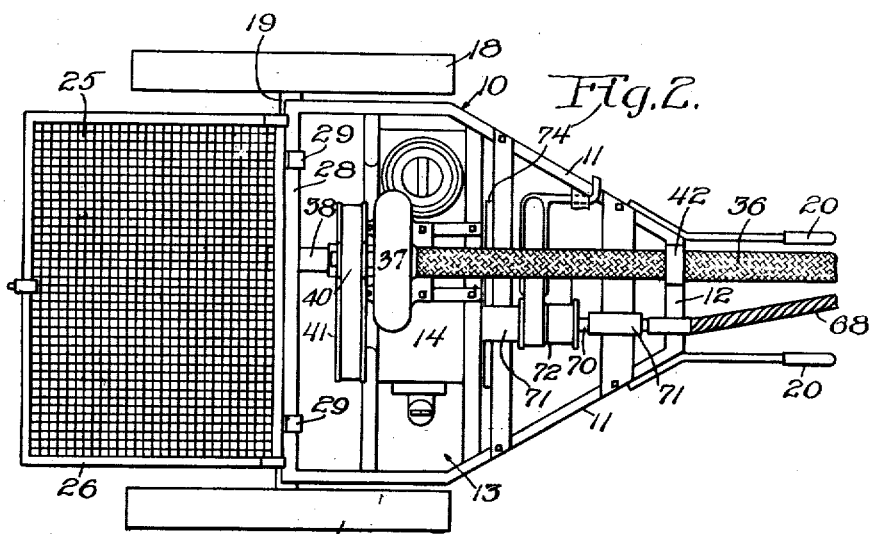
Fig. 2 is a plan view thereof, with parts broken away.

25 designates a receiving receptacle to which the cotton is conveyed from the picker head. The skeleton frame of this receptacle is made of flanged bars 26 between which is stretched wire netting 27; and one of the sides of the receptacle may be left open or may be provided with any suitable door as desired. The receptacle is shown as supported on the upper rear member 28 of the wheeled frame by means of hooks 29 in the manner shown in Figs. 1 and 2.

35 designates the picker head in which is mounted the active elements that pick the cotton fiber from the bolls. Said head is connected to the outer or free end of a conveying tube 36, preferably made of flexible material so that the head may be directed in all directions, and said tube is carried backwardly to a suction fan 37 that is supported on the top of the wheeled frame. The tube 36, as herein shown, is carried to the center of said fan and the eduction side of the fan is connected by a pipe or thoroughfare 38 to the receiving receptacle 25. The fan is driven by means of a belt or other suitable transmission device 40 from a pulley 41 of the engine or motor shaft. This fan is of special construction, producing the required suction to draw the cotton through the flexible tube and at the same time avoid clogging of the cotton fiber in the fan structure. The tube 36 is supported, forwardly beyond the fan, by a bracket 42 which rises from the machine frame. The tube is made of sufficient length to extend a considerable distance forwardly of the machine and from each side thereof so that the one machine may serve two or more rows of cotton plants.

If desired, a single fan blower may be connected, through a plurality of such tubes, with a plurality of picker heads, so that a central plant of sufficient capacity located on one machine may be utilized for furnishing the power to operate a number of heads and thereby increase the capacity of the machine.

The picker head is of special construction and this construction is clearly illustrated in Figs. 3 to 7, which show the picker head apart from the remainder of the cotton harvester.

Referring to the picker head mechanism shown in Figs. 3 to 7 inclusive, said mechanism embraces the following operatively combined elements:—45, 45 designate two brushes which are fixed to shafts 46, 46 that are rotatively mounted in suitable bearings 47 at the side walls 48, 48 of the picker head casing. The shafts of said brushes are parallel, and the bristles 50 are of such length as to interact at their meeting ends. The brushes are rotated in opposite directions, as indicated by the arrows, in a way to carry the cotton rearwardly. The brushes are located in an enlarged portion 51 of the casing which is open at its forward side to provide a mouth 52. The casing is reduced rearwardly of the brush inclosing enlarged front end to provide a neck portion 54 which is suitably connected to and communicates with the flexible tube 36. Conveniently the upper side of the casing is removable to constitute a cover member 55 (Fig. 3) that is fixed in place by means suitably located overlapping lugs 56 on the cover member and the main body of the head to receive attaching bolts 57. Removal of the cover member permits free access to the brushes and to other parts of the mechanism hereinafter described.

Located in rear of and opposite to the meeting faces of the brushes is a take-off or transfer device which is so constructed and arranged as to positively remove the cotton from the brushes as the proximate sides of the brushes are rotated rearwardly. Said take-off device is constructed to merely remove the cotton from the brushes, there being suitable conveying means in rear thereof to receive cotton so removed and to carry it backwardly through the tube 36 into the receptacle 25. The take-off or transfer device shown in Figs. 5, 6 and 7, is made as follows:—

60 designates a shaft which is fixed in any suitable manner, as by a cross pin, in an elongated bearing 61 of the cover member of the head and is disposed at a right angle to the axes of the brush shafts. 62 designates a sleeve or bushing which is rotatively or loosely mounted on said shaft. Said shaft is provided at one end with an eccentric head 63 between which and inner end of the elongated bearing 61 the sleeve 62 is confined. 64 designates a plurality of pointed pins or spurs which are fixed in any suitable manner to said sleeve and extend radially therefrom in angularly spaced rows that travel in contact with the brushes and parallel to the planes of the axes of the brushes. 65 designates a shell which surrounds the sleeve 62 and is provided at one end, remote from the elongated bearing 61, with an integral bearing stud 66. Said stud is rotatively mounted in a suitable bearing bushing 67 that is seated in an opening in the bottom wall of the picker head casing. The axis of rotation of said stud of the shell 65 is eccentric to the axis of rotation of the sleeve 62, and the end wall 68 of said shell is provided with a recess to receive the enlarged head 63 of the shaft 60, said head of the shaft being rotatively mounted in the recessed shell.

The said shell 65 is provided with a plurality of apertures through which extend the radial pins 64, and by reason of the eccentricity of the axes of the shell and sleeve, the said pins extend at various distances from the outer face of the shell in different parts of the circumference of the shell. With this construction it will be observed that when the shell is rotated it acts, through the connection of the pins therewith, to also rotate the sleeve 62 and, by referring to Figs. 6 and 7, it will be observed that the axis of rotation of the sleeve 62 is offset toward the brushes relatively to the axis of rotation of the shell 65 so that when the pins are presented toward the brushes they extend a distance from the shell into the bristles of the brushes in position to dislodge or remove the cotton from the brushes, and that as the shell and pins rotate rearwardly from the brushes said pins retreat or disappear into the shell to such an extent that on the side of the shell remote from the brushes the pins have entirely disappeared. Thus cotton is released from the pins so as to permit the cotton to be removed by a suitable conveyer in rear thereof, one form of which conveyer will be hereinafter described.

The said rotating disappearing pins and the brushes may be operated in any suitable manner to produce the results described. As herein shown the driving connections for operating said members are made as follows:—

69 designates a flexible driving shaft which is rotatively mounted in a bearing 69¹, carried by the flexible tube 36 near the picker head. Said flexible shaft is connected to a rigid shaft 70 that is mounted in suitable bearings 71, 71 carried by and rising from the machine frame. Between said bearings a pulley 72 is fixed to said shaft which is driven by a belt trained about pulley 73 on the power shaft of the engine adjacent to the fly wheel 74 thereof. The forward end of said flexible shaft is connected to a rigid shaft section 76 (Fig. 6) that is mounted in a suitable bearing 77 carried by the picker head casing. Said shaft 76 is provided with a beveled gear 78 which meshes with a beveled gear 79 that is fixed to a shaft 80 which extends transversely across the casing and is mounted in suitable bearings 81, 81 carried by the side walls of said casing near the bottom thereof. Said beveled gear 79 meshes with a beveled gear 83 which is fixed to or is made integral with the bearing stud 66 of the shell 65, whereby said shell is rotated. One end of said shaft 80 is provided with a spur gear 85 (Fig. 3) which meshes with a spur gear 86 that is fixed to the shaft 46 of one of the rotary brushes, and the spur gear 86 meshes with a third spur gear 87 which is fixed to the shaft 46 of the other rotary brush 45. The arrow in Fig. 3 indicates the direction of rotation of the several spur gears.

The gearing described is such that the proximate sides of the brushes are rotated in reverse directions and rearwardly, and carry the cotton dislodged thereby from the bolls into the sphere of action of the take-off or transfer device consisting of the series of rotating disappearing pins, said transfer device carrying the cotton into the sphere of action of the conveyer of whatever type may be employed.

The particular type of conveyer herein shown is a pneumatic conveyer, which comprises as an element thereof the suction fan 37 before referred to.

In order to employ the suction of said fan to convey the cotton from the rotary transfer device backwardly through the flexible tube 36 without drawing objectionable extraneous substances into the head with the cotton the casing of the picker head is provided in rear of the brushes with one or more induction openings 90. The suction induced by the fan 37 in the flexible tube 36 and the neck 54 of the head produces a low pressure area within the head immediately in rear of the transfer device and in a region of comparatively still or non-flowing air, such as will dislodge the cotton fiber from the transfer device and pass the same backwardly into the region of moving air or in rear of the induction openings; it being apparent that the region within the picker head in rear of induction openings is subject to a moving blast rather than a relatively non-flowing area such as exists forwardly of said induction openings. The state of pressure in this low pressure area in connection with the centrifugal action of the take-off device is sufficient to dislodge or remove the cotton from the transfer or take-off device. Therefore there is provided a pneumatic conveyer which is sufficiently active to carry the cotton backwardly from the head and through the flexible tube 36 and into the receptacle 25, but which does not draw into the head solid particles, such as broken parts of the cotton burs or twigs or leaves of the cotton plant. Therefore the cotton is free from such objectionable extraneous materials and is in condition for efficient ginning.

In order to prevent the brushes themselves drawing into the head broken particles of burs, twigs or leaves, suitable guards may be interposed between the brushes and the open mouth of the head. As herein shown such guards, designated by 92, of which there are a number springing from both the upper and lower walls of the casing, are each made of a single piece of wire that is bent in general U-form and extends through the casing walls for fixed attachment to the head, said wires being attached to anchor bars 93 suitably fixed exteriorly to the upper and lower casing walls. Said guards are curved to conform generally to the curvature of the brushes and the upper set of the guards terminate short of the lower sets thereof so as to provide space between the upper and lower sets to facilitate the entrance of the cotton to the head when drawn thereinto by the brushes. Obviously any other form of guard suitable for the purpose may be employed. One arm of each of said guards 92 is made longer than the other arm to extend through the casing walls for suitable attachment to the anchor bars 93. The other ends of the U-shaped guards 92 are so spaced relatively to the top and bottom walls of the picker head casing as to engage said walls when the guards are flexed or bent inwardly toward the brushes, and said free ends of the guards constitute stops to prevent the guards being pushed against the cores of the brushes which would effect a brake action against the rotation of said brushes. The said guards are made of any suitable resilient material, such as spring steel and yield inwardly toward the brushes by the application of the force of the rapidly rotating brushes, which pulls the cotton from the bolls and draws the cotton into the head between the proximate ends of the two sets of guards. The resiliency of said guards serves, when the cotton is released from the bolls, to spring the guards outwardly in a manner to throw off or reject the bolls and thereby serve as a further means of preventing the bolls or parts thereof passing into the head. The springing of the guards inwardly by the action described serves to expose greater lengths of the bristles of the brushes which pass between the guards so that said brushes may more effectively engage the cotton. Moreover, when the guards are thus swung inwardly about their points of attachment to the casing walls, the inner or proximate ends of the guards are separated a greater distance than in the normal position of the guards, so as to somewhat increase the throat opening through which the cotton passes into the head.

It will be obvious that the transfer or take-off device, consisting in general terms of a movable element placed in rear of the brushes, which directly pick the cotton from the burs, coact with the bristles of the brushes to transfer the cotton from the brushes to the sphere of action of a conveyer device. So far as the transfer or take-off device of the invention is concerned the conveying device may be otherwise constructed and arranged so long as the cotton is conveyed rearwardly with no substantial compressing or matting of the staple. The pneumatic conveyer herein shown, however, and arranged in the manner described is advantageous inasmuch as it avoids the liability of drawing into and through the picker head extraneous substances which would be objectionable in the cotton staple and which at the same time provides for an efficient transfer of the cotton from the picking brushes to the conveyer. The disappearing type of take-off device is advantageous in that it serves to strip the cotton fibers from the picker business, and to deliver it efficiently to the sphere of action of the moving current of air in the conveyer tube.

It will be noted that the brushes most closely approach each other and interact to draw the cotton rearwardly into the head in a plane coincident with the center of the head and of the neck and that the take-off or transfer device is located centrally in the head and rotates about an axis which is transverse to (at right angles as shown herein) the axis of rotation of the brushes, and that said take-off device wipes through the bristles of the brushes at the meeting sides thereof throughout practically the entire length of the brushes, as will be apparent from a consideration of Figs. 6 and 7. Therefore the path of the cotton through the head and backwardly into the influence of the moving column of air in rear of the induction openings 90 in the head is a straight path and located centrally of the head so that the cotton is carried into the head with a minimum disturbance to the cotton fibers in the way of rubbing them upon themselves and against the walls of the passageway into the head. The effect of this construction is, first, that the machine may run at a high rate of speed and the picker mechanism of the head will not become clogged and, second, the fiber of the cotton is disturbed to a small extent and is not compacted or intertwined.

It may be here noted that the brushes act on the cotton while pulling the cotton from the bur in the manner of a comb both by reason of the fact that the bristles of the brushes pierce the cotton locks while the cotton is passing between the brushes, and by reason of the fact that the brushes, which are traveling at considerable speed, have movement relatively to the cotton fiber while the fibers are being pulled from the burs, and this relative movement is dependent somewhat upon the tenacity with which the cotton sticks to the burs. Furthermore, after the cotton is removed from the burs by the brushes the pins of the take-off device effect a further combing action on the cotton by reason of the fact that the take-off device rotates at a higher speed than the brushes, as will be evident from an inspection of the gear ratio of the gears 86, 87, of the brushes and the gear 85 through which power is transmitted to drive the brushes by mechanism which also drives the take-off device. This combing of the cotton thus effected opens the locks and segregates them and their seeds from each other and has the effect to loosen the boll dirt and leaf particles from the cotton so that when the cotton is delivered by the take-off device into the sphere of the moving column of air at the rear of the brushes the boll dirt and leaf particles, being somewhat heavier than the cotton, are discharged from the conveyer in advance of the cotton and pass directly through the screen-like wall of the basket or receiver while the clean cotton drops to the bottom of said basket or receiver. That portion of the chamber of the casing head containing the take-off device is enlarged at its side abreast the take-off device to provide ample clearance for the cotton between the take-off device and the casing wall and to avoid pressing or matting of the cotton as it passes around the take-off device so that thereby the open or fluffy condition of the cotton is maintained and its fluffy condition permits the air to pass freely through the fibers to free therefrom boll dirt and leaf particles and to dry the cotton.

I claim as my invention:

1. A cotton picker comprising a picker head open at its front and having a rearwardly extending hollow neck adapted for connection to a suction pipe, oppositely rotative, interacting brushes mounted at the open front of said head and a rotative take-off device in rear of said brushes arranged centrally of said head and adapted to travel between and in contact with said brushes, said head being provided in rear of said brushes with an induction port.

2. A cotton picker comprising a picker head open at its front and having a rearwardly extending hollow neck adapted for connection to a suction pipe, oppositely rotative, parallel brushes mounted at the open front of said head, with the bristles thereof meeting in a plane coincident with the longitudinal axis of said head and a take-off device in rear of said brushes and rotative in contact with the brushes about an axis transverse to the axes of rotation of said brushes, said head being provided in rear of said brushes with an induction port.

3. A cotton picker comprising a picker head open at its front, oppositely rotative, interacting flexible bristle brushes mounted at the open front of said head, a rotative take-off device in rear of said brushes and arranged centrally of said head and adapted to travel between and in contact with the bristles of said brushes, said head being provided in rear of said brushes with an induction port, and two sets of guards mounted on opposite walls of the head and extending toward, but terminating short of each other.

4. A cotton picker comprising a picker head open at its front and having a rearwardly extending hollow neck adapted for connection to a suction pipe, oppositely rotative, interacting brushes mounted at the open front of said head, a rotative take-off device in rear of said brushes arranged centrally of said head and adapted to travel between and in contact with said brushes, said head being provided in rear of said brushes with an induction port, and two sets of guards in front of the brushes mounted on opposite walls of the head and extending inwardly toward, but terminating short of each other, with means for limiting the movement of the guards toward the brushes.

5. A cotton picker comprising a picker head having an open mouth, rotating interacting picker brushes at said mouth, a take-off device in contact with the brushes for removing the cotton therefrom, and resilient guards at said mouth extending partially across said brushes between which the bristles of said brushes are adapted to extend.

6. A cotton picker comprising a picker head having an open mouth, rotating interacting picker brushes at said mouth, a take-off device movable in contact with the brushes for removing the cotton therefrom, and resilient guards mounted on opposite walls of the head in front of said brushes and extending inwardly toward each other and spaced from each other at their proximate ends and between which the bristles of said brushes extend.

7. A cotton picker comprising a picker head having an open mouth, rotating interacting picker brushes at said mouth, a take-off device coacting with the brushes for removing the cotton therefrom, and two sets of U-shaped resilient guards mounted on opposite walls of the head in front of the brushes, one member of each guard being normally spaced from the wall to which it is attached but adapted to contact with said wall when the guard is sprung toward the brushes to limit the bending movement of said guard.

8. A cotton picker comprising a picker head having an open mouth, picker brushes at said mouth, and resilient guards extending partially across said mouth in front of the brushes and springable toward said brushes and having stop means to limit their movement toward said brushes.

9. A cotton picker comprising a picker head having an open mouth, picker brushes at said mouth, and resilient guards extending partially across said mouth and terminating at the opening thereof and normally inclined toward said brushes and springable toward said brushes and between which the bristles of said brushes extend.

10. A cotton picker comprising a picker head having an open mouth, picker brushes at said mouth, and spring guards anchored to the walls of the head and terminating at the opening to said mouth and springable toward the brushes and acting by their resiliency to reject or throw out the cotton burs from the head when the cotton is removed therefrom.

11. A cotton picker comprising a picker head having an open mouth, picker brushes at said mouth, and two sets of spring guards anchored to opposite walls of the head and terminating at the opening to said mouth and extending inwardly toward but terminating short of each other, each set of guards extending well beyond the axis of rotation of its associated brush.

12. A cotton picker comprising a picker head having an open mouth, oppositely rotative picker brushes at said mouth between which, and substantially through the action of the brushes alone, the cotton is drawn rearwardly into the head, and resilient guards extending partially across said mouth and springable toward said brushes and adapted to be sprung toward said brushes by the force of the brushes in removing the cotton from the burs, whereby when the cotton is so removed the resiliency of the guards restores them to normal position and they thereby reject the burs.

13. A cotton picker comprising a picker head having an open mouth, oppositely rotative picker brushes at said mouth between which, and substantially through the action of the brushes alone, the cotton is drawn rearwardly into the head, resilient guards extending partially across said mouth and springable toward said brushes and adapted to be sprung toward said brushes by the force of the brushes in removing the cotton from the burs, whereby when the cotton is so removed the resiliency of the guards restores them to normal position and they thereby reject the burs, and stop means to limit the movement of the guards toward said brushes.

14. A cotton picker comprising a picker head having an open mouth, oppositely rotative picker brushes at said mouth between which, and substantially through the action of the brushes alone, the cotton is drawn rearwardly into the head, resilient guards extending partially across said mouth and springable toward said brushes and adapted to be sprung toward said brushes by the force of the brushes in removing the cotton from the burs, whereby when the cotton is so removed the resiliency of the guards restores them to normal position and they thereby reject the burs, and take-off means coöperating with the brushes to remove the cotton therefrom, the head being provided in rear of the brushes with an induction port.

15. In a cotton picker, a picker head comprising interacting, oppositely rotative picker brushes, a rotative take-off device in contact with said brushes embracing a series of pins to travel between the brushes lengthwise of the latter, said device embracing also means operative through rotation of the device to strip the cotton therefrom.

16. In a cotton picker, a picker head comprising oppositely rotative picker brushes, a rotative take-off device in rear of said brushes embracing a series of radial pins movable in contact with and between the brushes in a direction lengthwise thereof, and eccentric means operative through rotation of the pins to strip the cotton therefrom.

17. In a cotton picker, a picker head comprising rotative, interacting picker brushes, a take-off device in contact therewith, embracing a series of radial pins, a perforated shell outwardly through which the pins extend, the axes of rotation of the shell and said series of pins being eccentric with respect to each other, with means for rotating the take-off device.

18. In a cotton picker, a picker head comprising oppositely rotative, interacting picker brushes, a rotative take-off device in rear thereof and engaging the bristles of said brushes, embracing a series of radial pins, a perforated shell outwardly through which the pins extend, the axes of rotation of the shell and said series of pins being eccentric with respect to each other and means for rotating the take-off device.

19. In a cotton picker, a picker head embracing interacting, oppositely disposed picker brushes between which the cotton is drawn from the bur, and a take-off device at said head coacting with said brushes, embracing a series of pins movable between the brushes in the direction of their length, and embracing also stripping means to strip the cotton from said pins.

20. In a cotton picker, a picker head embracing interacting rotative picker brushes, and a takeoff device acting against the brushes comprising a rotative annular member, combined with a series of pins rotative on an axis eccentric to the axis of rotation of said member, whereby said pins are projected from and disappear into said member in the rotation of the latter.

21. A cotton picker, comprising a picker head having an open mouth, rotative picker brushes at said mouth, a shaft in rear of said brushes, a sleeve mounted on said shaft, a series of radial pins carried by the sleeve in contact with said brushes, and a shell mounted to rotate in the casing on an axis eccentric to and inclosing the axis of said sleeve and provided with perforations through which said pins extend.

22. A cotton picker, comprising a picker head having an open mouth, rotative picker brushes at said mouth, a shaft in rear of said brushes, a sleeve mounted on said shaft, a series of radial pins carried by the sleeve in contact with said brushes, a shell mounted to rotate in the casing on an axis eccentric to and inclosing the axis of said sleeve and provided with perforations through which said pins extend, gearing operatively connecting said shell to the brushes, a driving shaft, and gearing connecting the driving shaft to said shell.

23. In a cotton picker, a picker head comprising picker means and a take-off means, the latter embracing a series of radial, rotative pins coacting with the brushes and stripping means operative through the rotation of the pins to strip the cotton therefrom, combined with a conveyer means to convey the cotton from the picker means.

24. In a cotton picker, a picker head comprising picker means, a rotative take-off device in rear thereof and contacting therewith comprising a series of radial pins, a shell inclosing the pins and perforated to permit the pins to extend therethrough, the axis of rotation of said shell being eccentric to the axis of rotation of the pins and means to rotate the shell.

25. In a cotton picker, a picker head comprising picker means, a take-off device in rear thereof and coacting therewith comprising a fixed shaft, a sleeve thereon, a series of radial pins carried by the sleeve, a shell surrounding said sleeve and perforated to permit the pins to pass therethrough, said shell being rotatively mounted in the casing on an axis eccentric to the axis of rotation of said sleeve, and means to rotate said shell.

26. In a cotton picker, interacting, rotative picker brushes, a plurality of take-off teeth movable to contact with and away from the brushes in the direction of the length of the brushes, a perforated stripping element and means to alternately project said teeth from and withdraw them into said stripping element.

27. A cotton picker comprising a picker head having an open mouth and a rearwardly extending neck for connection to a suction pipe, oppositely rotative interacting brushes at said mouth and a rotative take-off device in rear of said brushes and coacting therewith, said head being interiorly enlarged abreast the take-off device beyond the width of the mouth to provide ample space between the same and the wall of the device to avoid compression of the cotton as it is carried rearwardly by the take-off device.

28. A cotton picker comprising a picker head having an open mouth and a rearwardly extending neck for connection to a suction pipe, oppositely rotative interacting brushes at the mouth of the head and a rotative take-off device in rear of and coacting with said brushes, said head being interiorly enlarged abreast the take-off device to provide ample space between the same and the wall of the device to avoid compression of the cotton as it is carried rearwardly by the take-off device, said head being provided in rear of said brushes with an induction port.

29. A cotton picker comprising a head, opposed, interacting, flexible picker and fiber loosening mechanism therein constructed with means to comb and loosen the cotton locks and to segregate them and their individual seeds and adhering cotton from each other to produce a fluffy seed cotton, and a pneumatic conveyer to carry the cotton rearwardly from the head, constructed with means in rear of said picker mechanisms to receive air, said head and conveyer being proportioned to avoid compression of the cotton.

30. A cotton picker comprising a head, movable interacting picker elements therein, by the movement of which the cotton is drawn rearwardly between said elements from the bur into the head to effect a combing and loosening of the cotton, means to remove the cotton from the picker elements constructed with means to further comb and loosen the cotton, and a pneumatic conveyer to carry the cotton rearwardly from the head, constructed with means in rear of said picker elements to receive air, said head and conveyer being proportioned to avoid compression of the cotton.

In witness whereof I claim the foregoing as my invention, I hereunto append my signature in the presence of two witnesses at Chicago, Illinois, this 18 day of April, 1917.

LOUIS CARROLL STUKENBORG.

Witnesses:
W. L. HALL,
A. E. WALBRIDGE.